United States Patent Office 3,032,584
Patented May 1, 1962

3,032,584
p-BIS-(2-CHLOROETHYL)AMINOPHENYLALA-NINE AND THE PROCESS FOR THE PRODUCTION THEREOF
Franz Bergel and John Albert Stock, London, England, assignors to National Research Development Corporation, London, England, a British corporation
No Drawing. Filed Mar. 12, 1954, Ser. No. 415,964
Claims priority, application Great Britain Mar. 17, 1953
6 Claims. (Cl. 260—518)

This invention relates to chemotherapeutic agents and has as an object to provide an improved compound having tumour growth inhibitory action and process for the manufacture thereof.

Aromatic compounds containing the cytotoxic group $(CH_2CH_2Cl)_2N—$ (M) on an aromatic ring have been described (see Ross, J.C.S. (1949), 183, and British Empire Cancer Campaign Annual Report, 1951, 8). This grouping has never been combined with a naturally occurring amino-acid.

The novel compound of the present invention is p-bis-(2-chloroethyl)-aminophenylalanine which is a chemotherapeutic agent of the formula:

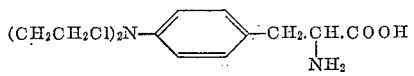

It will be understood that the present invention extends to the D and L forms as well as the racemic or DL form of the novel compound.

The L form has greater tumour growth inhibitory action than either the D form or the racemic form. All forms are, however, effective tumour growth inhibitors when tested against transplanted Walker rat carcinoma.

According to the process of the present invention for the manufacture of p-bis-(2-chloroethyl)-aminophenylalanine a compound of the general formula:

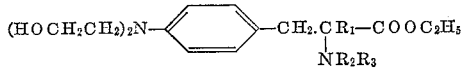

in which $R_1$ is H or $COOC_2H_5$, $R_2$ is H and $R_3$ is CHO or $CH_3CO$ or $R_2$ and $R_3$ are together

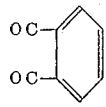

is heated with phosphorus oxychloride or thionyl chloride.

According to an embodiment of the process of the invention ethyl-N-phthaloyl-p-bis-(2-hydroxyethyl)-aminophenylalaninate is heated with phosphorus oxychloride.

According to another embodiment of the process of the invention diethyl p-bis-(2-hydroxyethyl)aminobenzylformamidomalonate is heated with thionyl chloride.

According to a further embodiment of the process of the invention diethyl p-bis-(2-hydroxyethyl)-aminobenzylacetamidomalonate is heated with thionyl chloride.

The following examples illustrate the invention:

Example 1

(a) p-Nitrophenylalanine (Erlenmeyer, E. and Lipp, A., Annalen, 1883, 219, 213: 10.0 g.) was refluxed for 1½ hours in dry pyridine (75 g.) with phthalic anhydride (7.05 g.), the solution filtered, concentrated, and refluxed for a few minutes with acetic anhydride (25 g.). The solution was poured into water with stirring and supernatant acidified to Congo red indicator paper with hydrochloric acid. The mixture was allowed to stand overnight. The clear supernatant layer was poured off, water was added to the gummy product and the mixture heated almost to boiling. The gum solidified on cooling to a white crumbly solid (15.5 g.). A double crystallisation of part of the product from chloroform-60/80° C. petroleum ether gave tiny colourless needles, M.P. 175–6° C. of N-phthaloyl-p-nitrophenylalanine. (Found: C, 59.6; H, 3.84; N, 8.20%. $C_{17}H_{12}O_6N_2$ requires C, 60.0; H, 3.55; N, 8.23%.)

(b) Crude N-phthaloyl-p-nitrophenylalanine (16.7 g.) was dissolved in ethanol (80 g.), the solution saturated with dry hydrogen chloride and refluxed for 1½ hours. The liquid was cooled, poured into a 0.5% (approx.) aqueous sodium chloride solution (1000 g.) and the product extracted with ether. The ethereal solution was washed with sodium bicarbonate solution, then with water, and was dried over magnesium sulphate. Evaporation of the solvent yielded a gum (15.4 g.) which crystallised from n-propanol in colourless prisms, M.P. 91–3° C. of ethyl N-phthaloyl p-nitrophenylalaninate (9.1 g.). Two further recrystallisations, with charcoal treatment in the final crystallisation raised the M.P. to 95.5–96° C. (Found: C, 61.7; H, 4.39; N, 7.61%. $C_{19}H_{16}O_6N_2$ requires C, 61.95; H, 4.38; N, 7.61%.)

(c) Ethyl N-phthaloyl p-nitrophenylalaninate (9.0 g.) was hydrogenated in a mixture of ethyl acetate (120 g.) and methanol (80 g.) with a palladium-calcium carbonate (1% Pd) catalyst (1.4 g.). When gas uptake was complete, the filtrate from the hydrogenation mixture was evaporated under reduced pressure. The residual gum was taken up in ether, the solution filtered, and a slight excess of a dry ethereal hydrogen chloride solution added slowly with stirring. The gummy precipitate became granular on rubbing and the ether-washed product was crystallised from ethyl acetate-acetone (1st crop, 2.8 g., M.P. 188–192° C. (decomp.); 2nd crop, 3.9 g., M.P. 189–192° C. (decomp.)). Part of the first batch was recrystallised from ethyl acetate and gave very slightly tinted needles, M.P. 188–190° C. (decomp.) of ethyl N-phthaloyl p-aminophenylalaninate hydrochloride. (Found: N, 7.42; Cl, 9.30%. $C_{19}H_{19}O_4N_2Cl$ requires N, 7.48; Cl, 9.48%.)

The free base was obtained from the hydrochloride by adding a slight excess of dilute ammonium hydroxide to the aqueous solution, and crystallising the product from aqueous methanol. A further recrystallisation with charcoal treatment gave almost colourless needles, M.P. 110–112° C. of ethyl N-phthaloyl p-aminophenylalaninate. (Found: N, 8.29%. $C_{19}H_{18}O_4N_2$ requires N, 8.28%.)

(d) Ethyl N-phthaloyl p-aminophenylalaninate (3.15 g.) (unrecrystallised) was suspended in water (50 g.) and glacial acetic acid (30 g.) added. To the clear solution, ethylene oxide (8.0 g.) was added, the mixture allowed to stand for 17 hours, and then poured into water (350 g.). The solution was neutralised with sodium hydrogen carbonate and the liberated gum extracted with ether. The ethereal solution was dried (magnesium sulphate) and evaporated. The residual gum 3.95 g.) was dissolved in benzene (50 g.) and the solution dried azeotropically by distilling off some of the solvent. Freshly distilled phosphorus oxychloride (8 g.) was added and the mixture heated under reflux for 30 minutes. The solvent was evaporated off under reduced pressure, and the residual gum refluxed with concentrated hydrochloric acid (50 g.) for 6 hours. The solution was allowed to cool overnight. It was filtered from the phthalic acid crystals, and freeze dried, and to the pink residue was added acetone (160 g.) and ethyl acetate (50 g.). The mixture was left in the cold room overnight and the clear pink supernatant liquid poured off. The pink gummy hydrochloride remaining in the flask was dissolved in water (20 g.), saturated sodium acetate solution added until precipitation was complete, and the product collected and dried in a desiccator. The crude p-bis-(2-chloroethyl)-aminophenylalanine (3.6 g.) was crystallised from methanol giving colourless needles, M.P. 172–4° C. (decomp.) of p-bis-(2-chloroethyl)-aminophenylalanine. (For further recrystallised material, found: C, 51.1; H, 6.01; N, 8.87; Cl, 23.2%. $C_{13}H_{18}O_2N_2Cl_2$ requires C, 5.11; H, 5.90; N, 9.18; Cl, 23.3%.)

Example 2

(a) p-Nitrophenylalanine was refluxed in 3.5 N ethanolic hydrogen chloride, the solution evaporated and the residue recrystallised from acetone-methanol, producing colourless needles, M.P. 179–181° C. This product (1.00 g.) was suspended in dry benzene (8 ml.) and diethylamine (0.27 g.; 0.3 ml.; 1.00 mol.) was added. The mixture was shaken until no ester hydrochloride crystals were visible. Dry ether was added to the turbid liquid until precipitation was complete, the diethylamine hydrochloride filtered off and the filtrate evaporated almost to dryness under vacuum. The oily residue was taken up in dry benzene (15 ml.) and powdered phthalic anhydride (0.54 g.; 1.00 mol.) added with shaking. In less than a minute, the mixture suddenly thickened to a white pasty mass and its temperature rose. The mixture was evaporated under vacuum. The residue crystallised from acetone-light petroleum in tiny colourless crystals of ethyl-N-o'-carboxybenzoyl-p-nitro-DL-phenylalaninate (93%), M. P. 181° C.

(b) The above compound was refluxed for 1.5 hours with 3.5 N ethanolic hydrogen chloride (25 ml.). Removal of the solvent gave a pale yellow gum (1.08 g.) which crystallised from n-propanol in colourless prisms of ethyl - p-nitro-N-phthaloyl-DL-phenylalaninate (86%), M.P. 96.5–97.5° C., undepressed on admixture with the 95.5–96° C. melting compound prepared according to Example 1(b).

(c) The reduction was carried out as described in Example 1(c), the product having the same melting point 188–190° C. The isolation of the free base was also carried out as described in Example 1(c).

(d) The hydroxyethylation of the free base was carried out as described in Example 1(d) and the chlorination with phosphorus oxychloride was carried out as described in Example 1(d) and the same product was obtained.

Example 3

(a) L-phenylalanine was nitrated using the same method as for DL-phenylalanine (Erlenmeyer and Lipp, Annalen, 1883, 219, 213) except that the working up of the nitration mixture was carried out as follows: The viscous mixture was poured into cold water with stirring, a slight excess of diluted ammonium hydroxide was added, and the solution evaporated until solid began to appear. Recrystallisation from water gave colourless needles of the monohydrate of p-nitro-L-phenylalanine, M.P. 232–234° C. (decomp.), $[\alpha]_D^{25}$ +9.8±0.3° (c., 1.77 in N HCl). Ethyl-p-nitro-L-phenylalaninate hydrochloride (83%) was obtained in colourless rods, following the same method as described in Example 2(a). Ethyl-p-nitro-L-phenylalaninate gave after treatment as in Example 2(a) a 94% yield of the L-carboxybenzoyl compound, M.P. 180–182° C., $[\alpha]_D^{23}$ +19.4±0.3° (c., 2.94 in dioxan).

(b) Ethyl - p-nitro-N-phthaloyl-L-phenylalaninate was obtained by using the procedure described in Example 2(b) except that 2 N ethanolic hydrogen chloride was used to minimise the risk of racemisation.

(c) The resulting compound was converted to the amine as described in Example 2(c), and recrystallisation from dioxan-ethyl acetate gave colourless needles of the L-amine hydrochloride, M.P. 216–218° C. (decomp.), $[\alpha]_D^{22}$ −153±1° (c., 0.945 in 3:1 (by vol.) water-ethanol).

(d) The hydroxyethylation of the above compound and its chlorination was carried out as described in Example 2(d) except that the free base was obtained in situ by ammonia treatment of the hydrochloride and the chlorination product was refluxed for 3.5 hr. with 6 N hydrochloric acid. Precipitation with sodium acetate and crystallisation from methanol gave small colourless needles of monosolvated p-bis-(2-chloroethyl)-amino-L-phenylalanine (37.5%, calculated on the amine hydrochloride), M.P. 182–183° C. (decomp.), $[\alpha]_D^{25}$ +7.5±0.5° (c., 1.33 in N HCl).

Example 4

Example 3 was repeated using D-phenylalanine instead of L-phenylalanine. The intermediates and end-products had the following melting points and rotations:

p-Nitro-D-phenylalanine, M.P. 226–229° C. (decomp.) $[\alpha]_D^{20}$ −8.9±0.3° (c., 2.41 in N HCl), 88% yield.
Ethyl-p-nitro-D-phenylalaninate hydrochloride, M.P. 192–193.5° C., $[\alpha]_D^{20}$ −12.0±0.3° (c., 2.06 in water), 80% yield.
Ethyl-N-o'-carboxybenzoyl-p-nitro-D-phenylalaninate, M.P. 176–178° C., $[\alpha]_D^{21}$ −19.7±0.3° (c., 3.91 in dioxan), 93% yield.
Ethyl-p-nitro-phthaloyl-D-phenylalaninate, M.P. 79–80° C., $[\alpha]_D^{20}$ +207±1° (c., 1.72 in dioxan), 88% yield.
p-Bis-(2-chloroethyl)-amino-D-phenylalanine, M.P. 181.5–182° C. (decomp.) $[\alpha]_D^{21}$ −7.5±0.5° (c., 1.26 in N HCl), 34% yield.

Example 5

(a) The condensation of p-nitrobenzyl chloride (9.75 g.) and diethyl formamidomalonate (13.0 g.; 1.12 mol.) was carried out as described by Dornow and Winter (Chem. Ber., 1951, 84, 307) except that the mixture was heated under reflux for 2 hours. The residue obtained on filtering the hot reaction mixture crystallised from aqueous ethanol in colourless rods (13.6 g.) of diethyl-p-nitrobenzylformamidomalonate, M.P. 190° C. The filtrate from the reaction mixture deposited the same compound (0.83 g.), M.P. 189–190° C. (75%).

(b) Diethyl p-nitrobenzylformamidomalonate (4.0 g.) was hydrogenated over palladium-calcium carbonate in suspension in ethyl acetate-methanol. The nitro compound went into solution as the reduction proceeded and the p-aminobenzylformamidomalonate crystallised in colourless needles, M.P. 131–132° C. in 94% yield from ethyl acetate-light petroleum.

(c) Hydroxyethylation of the formamido compound (2.80 g.) with ethylene oxide (4 ml.) in 50% v./v. aqueous acetic acid (40 ml.) led to diethyl p-bis-(2-hydroxyethyl)-aminobenzylformamidomalonate (83%), M.P. 118° C. rising to 120.5° C. on recrystallisation from ethyl acetate light petroleum.

(d) Thionyl chloride (2 ml.) was added to a solution of diethyl p-bis-(2-hydroxyethyl)-aminobenzylformamidomalonate (1.00 g.) in dry alcohol-free chloroform (25 ml.). The clear solution was refluxed for 10 minutes. It was evaporated under vacuum, and the granular solid refluxed with concentrated hydrochloric acid (20 ml.) for 40 min. The method of isolation was the same as in Example 1(d), and crystallisation of the product from methanol gave p-bis-(2-chloroethyl)-aminophenylalanine, M.P. 179–180° C. (decomp.), undepressed on admixture with material prepared from DL-phenylalanine in 74% yield.

Example 6

Diethyl p-nitrobenzylacetamidomalonate was prepared according to Burckhalter, J. H., and Stephens, J. C., (J. Amer. Chem. Soc., 1951, 73, 56) and was catalytically reduced to the p-amino derivative. This compound was hydroxyethylated with ethylene oxide (6 ml.) in 25% aqueous acetic acid (40 ml.) at room temperature (17 hours). The product was worked up as in the preceding examples. Crystallisation from ethyl acetate gave colourless needles of diethyl p-bis-(2-hydroxyethyl)-aminobenzylacetamidomalonate (82%), M.P. 100° C. Thionyl chloride (2 ml.) was added to a solution of diethyl p-bis-(2 - hydroxyethyl)-aminobenzylacetamidomalonate (1.38 g.) in dry alcohol-free chloroform (25 ml.). The clear solution was refluxed for 10 minutes by which time it had begun to darken appreciably. It was evaporated under vacuum, and the residual gum refluxed with concentrated hydrochloric acid (20 ml.) for 3 hours. The method of isolation was the same as described in the preceding examples, and crystallisation of the product from methanol gave p - bis-(2-chloroethyl)-aminophenylalanine, M.P. 179–180° C. (decomp.), undepressed on admixture with material prepared from DL-phenylalanine in 63% yield.

We claim:
1. p-Bis-(2-chloroethyl)-aminophenylalanine.
2. p-Bis-(2-chloroethyl)-amino-L-phenylalanine.
3. A process for the manufacture of p-bis-(2-chloroethyl)-aminophenylalanine which comprises heating a compound of the general formula:

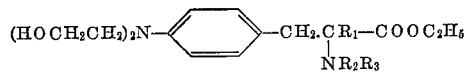

in which $R_1$ is selected from the group consisting of hydrogen and the $COOC_2H_5$ radical, $R_2$ is hydrogen and $R_3$ is selected from the group consisting of CHO and $CH_3CO$ radicals or $R_2$ and $R_3$ together represent the

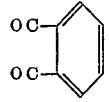

radical, with a chlorinating agent selected from the group consisting of phosphorus oxychloride and thionyl chloride.

4. A process for the manufacture of p-bis-(2-chloroethyl)-aminophenylalanine which comprises heating ethyl-N-phthaloyl-p-bis-(2-hydroxyethyl)-aminophenylalaninate with phosphorus oxychloride.

5. A process for the manufacture of p-bis-(2-chloroethyl)-aminophenylalanine which comprises heating diethyl p-bis-(2-hydroxyethyl)-aminobenzylformamidomalonate with thionyl chloride.

6. A process for the manufacture of p-bis-(2-chloroethyl)-aminophenylalanine which comprises heating diethyl p - bis-(2-hydroxyethyl)-aminobenzylacetamidomalonate with thionyl chloride.

References Cited in the file of this patent

Geschickter: J.A.M.A., February 1, 1930, pp. 326–28.
J.A.M.A., vol. 94, No. 22, pp. 1845, 1864, 1865, June 7, 1930.
Kaplan: Am. J. Cancer 167078C, pp. 210–213, January 1932.
Everett et al.: Journal of the Chemical Society (London) (1949), Part III, pp. 1972–83.
Harper et al.: Chem. Ab., vol. 45, col. 7193 (1951).